Sept. 14, 1965 S. N. KARALIS ETAL 3,205,562

METHOD OF MAKING A GLASS ENCLOSED CARBON-FILM RESISTOR

Filed May 9, 1961 3 Sheets-Sheet 1

*Fig. 3ᵃ.*

INVENTORS
Stephen N. Karalis,
John R. Pies
& Cecil L. Slattum
BY Stevens, Davis, Miller & Mosher
ATTORNEYS

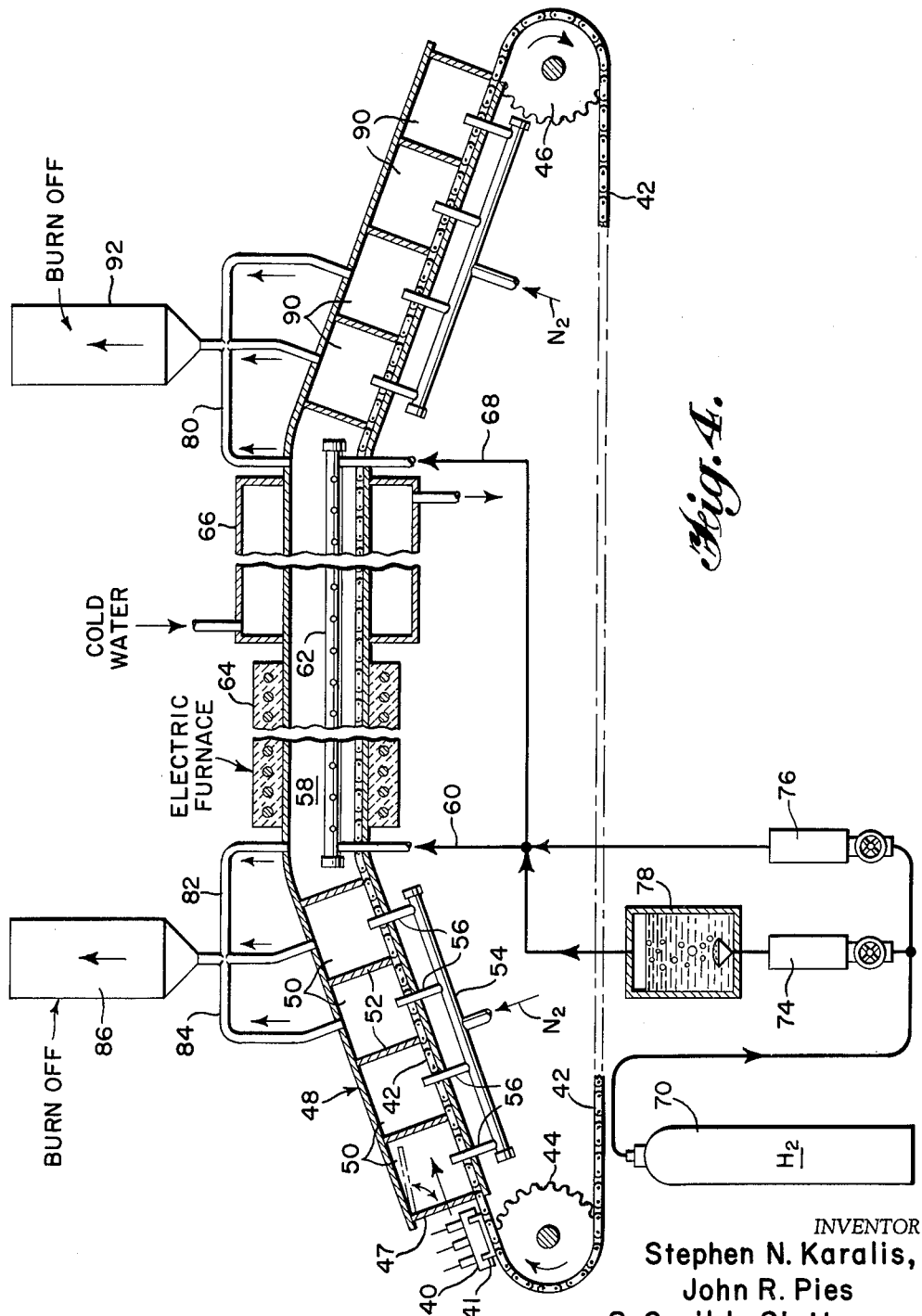

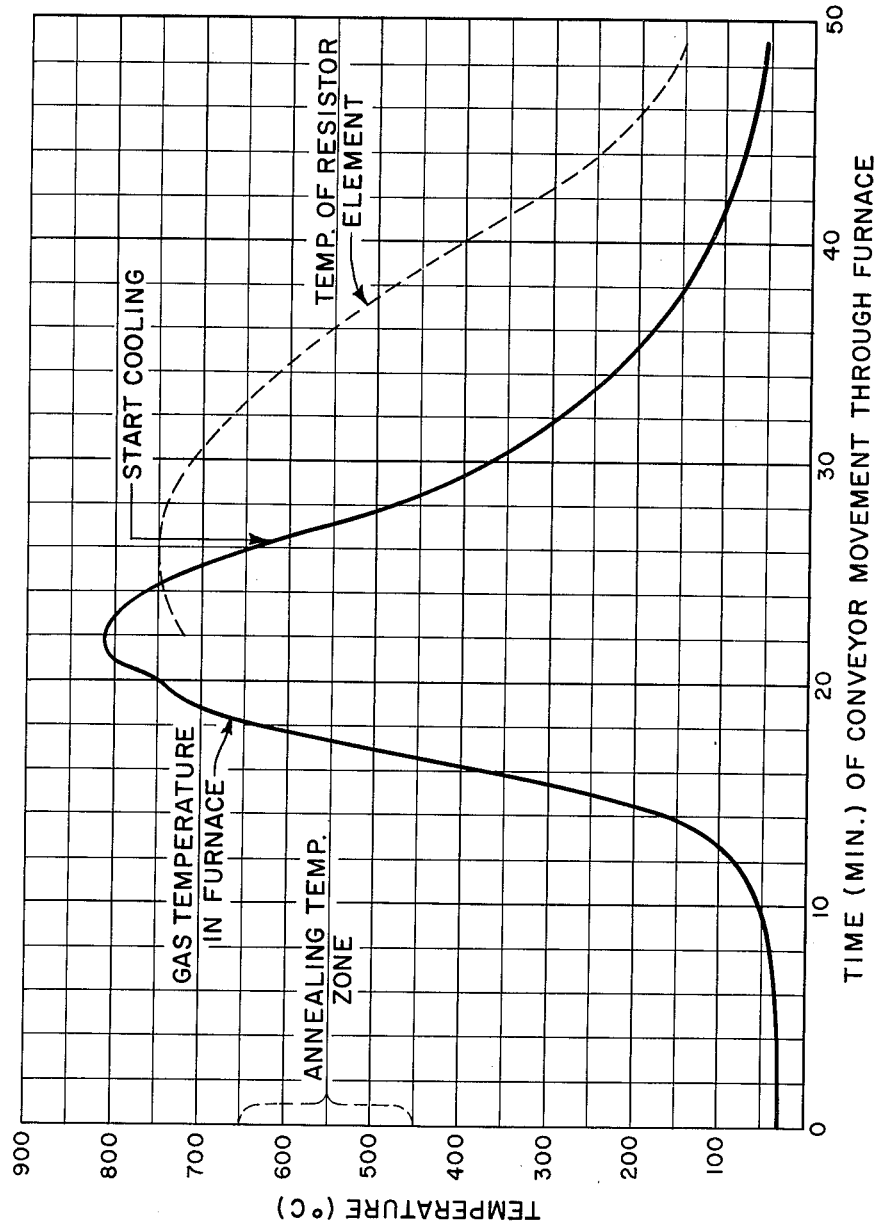

United States Patent Office 3,205,562
Patented Sept. 14, 1965

3,205,562
METHOD OF MAKING A GLASS ENCLOSED CARBON-FILM RESISTOR
Stephen N. Karalis, John R. Pies, and Cecil L. Slattum, Dallas, Tex., assignors to Texas Instruments Incorporated, Dallas, Tex., a corporation of Delaware
Filed May 9, 1961, Ser. No. 108,877
5 Claims. (Cl. 29—155.69)

The present invention relates to a novel resistor package and to a unique method for encapsulating resistor elements. More particularly the present invention relates to a resistor package of the carbon film type resistor and to an improved method for packaging a carbon film resistor to improve its stability and load life.

In the art of resistor manufacturing, it is common practice to produce carbon film resistors for the low price resistor market. To date, the quality of carbon film resistors has been good but not excellent. It has now been discovered that the difficulties involved in producing carbon film resistors of high quality are traceable to the manner of encapsulating of the resistor elements. It is common practice to encapsulate the carbon film resistor elements in a glass package. This is normally accomplished in a vacuum chamber wherein the vacuum is of a relatively high order. The purpose of this is to exclude from the resistor package all forms of impurities and, in particular, oxygen which would tend to degrade the carbon film by oxidation and thereby change its resistance value. Normally, glass encapsulation of the resistor element involves placing a glass sleeve about the resistor elements and heating them in a vacuum in order to fuse the ends of the glass sleeve to metal caps attached to the ends of the resistance element. During this process, quite frequently, the entire glass sleeve becomes molten and falls against the carbon film. When this occurs an intimate contact is established between the glass enclosure and the carbon film. Prior art attempts to provide a glass enclosure whereby the glass is in intimate contact with the carbon film throughout its area, thereby excluding the presence of any air which contains oxygen, have been unsuccessful. It has been discovered that such construction possesses disadvantages in that the glass is characterized by cracks and pin holes, and therefore oxygen reaches the carbon film. Also the glass can become conductive over a shunt path and shunt out portions of the resistance element.

Consequently the present invention is an extension of the philosophy generally acknowledged by the art that a more advantageous structure is achieved if the glass sleeve which surrounds and encapsulates the resistor core is prevented from coming into contact with it. In a conventional setup, great difficulty is experienced in preventing the glass sleeve from collapsing onto the carbon film during the sealing operation. The essence of this invention is the provision of a means and manner of successfully and reproducibly sealing a glass sleeve to a resistor element without a collapse of the glass sleeve onto the carbon film. This means includes a novel design for the end caps of the resistor element.

The present invention also stems from the knowledge that the electrical terminations employed to contact the carbon film usually contains an organic binder or carrier. Thereafter, it is customary to press fit end caps onto the electrical terminations, and finally seal a glass sleeve to the end caps to complete the enclosure. During the sealing, the high temperatures required drive off the organic binder and produce thermal decomposition resulting in the formation of some carbon, most probably of an amorphous variety. This amorphous carbon, if it deposits upon the crystalline carbon forming the carbon film of the resistor element, will tend to degrade its resistance characteristics. Consequently, care must be taken to remove any carbon deposits formed.

According to the present invention, the above and foregoing is accomplished by the provision of a novel resistor package and the unique method of encapsulating a resistor. The present invention is most particularly concerned with carbon film resistors and a package therefor, and to a method of encapsulating a carbon film resistor, whereby the film resistance element will have stability, longer load life and meet more rigid specifications than carbon film resistors heretofore known.

It is accordingly an object of the present invention to provide a novel carbon film package and a unique method of packaging carbon film resistors which will produce a carbon film resistor superior to those heretofore known and which will be competitive in the low priced resistor market.

Other and further objects of the present invention will become evident from the following description of a preferred embodiment thereof and the best mode contemplated for carrying it out with particular reference to the figures of the drawing wherein:

FIGURE 3a is a modified form of the carbon block of FIGURE 3;

FIGURE 4 is a schematic representation of the furnace in which the heat treatment occurs; and FIGURE 5 is a diagram showing the temperature profile of the furnace atmosphere as measured by a thermocouple traveling through the furnace in a resistor carrier.

Figure 1:
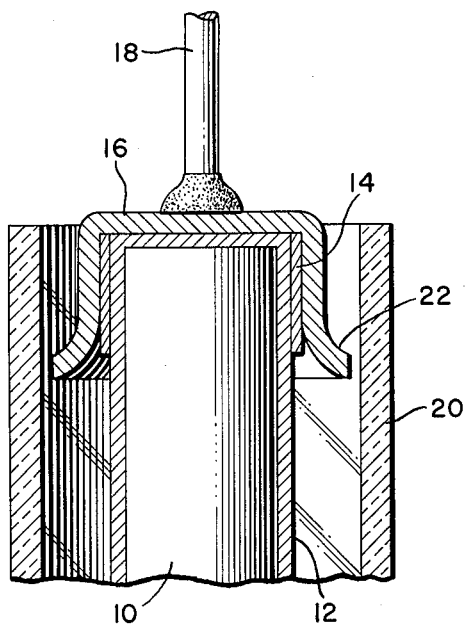
FIGURE 1 is a view in fragmentary section of a resistor package immediately prior to encapsulation by a glass sleeve.
Figure 2:
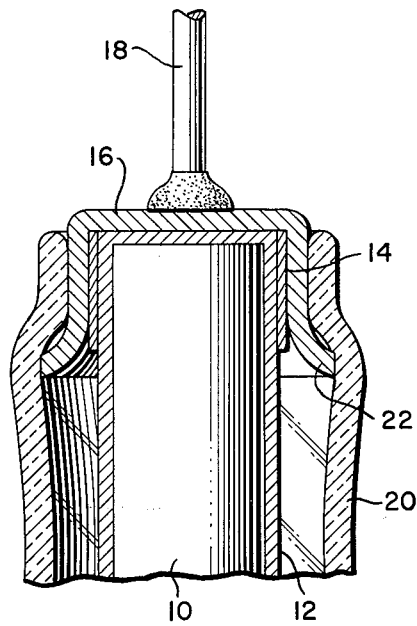
FIGURE 2 is a similar view in section of a resistor package showing the glass-to-metal seals between the glass sleeve and the end caps of the resistor.

Referring first to FIGURES 1 and 2, a preferred embodiment of the resistor package will be described in detail. The resistor package consists of an inner ceramic core 10 approximately 0.335 inch long and 0.062 inch in diameter and of cylindrical configuration. The preparation of the ceramic core is conventional in the art. The core is extremely pure and presents a reasonably smooth surface. Coated about the entire surface of the ceramic core 10 is a crystalline carbon film 12. This also is conventional in the art and consequently no elaborate explanation need be given here as to its accomplishment. Coated around the ends of the ceramic core 10 and carbon film 12 are rings 14 constituting electrical terminations. These rings 14 may be composed of silver, gold, nickel, or graphite and are applied in any way such as by painting, sputtering, spraying, or as often applied, in a particulate form with an organic binder or carrier. Thereafter end caps 16 are press fitted onto the ends of the resistor element in intimate contact with the electrical terminations 14. Welded to the end caps 16 are leads 18 of soft copper. The end cap 16 is composed of a suitable material that has matching thermal properties with reference to the glass to which it is attached. Examples of such material are "Kovar," "Rodar" or "Therlo," trade names for well known iron-nickel-cobalt alloys. A glass sleeve 20 such as Corning Glass Works No. 7052, or other "hard" glass having a thermal expansion coefficient corresponding to the material of the end cap 16, surrounds the resistor element, and a glass-to-metal seal exists between the ends of the glass sleeve 20 and the end caps 16. It will be noted that the end caps 16 are provided with a flared lip designated by the reference numeral 22. In a specific embodiment the end caps 16 have a diameter of 0.074 inch plus or minus .002 inch, and the diameter of the lip of the end cap at the flare 22 is 0.080 inch plus or minus .0015 inch. The glass sleeve 20 is slightly larger in internal diameter than the resistor assembly that fits therein. This is visually demonstrable from FIGURE 1 which shows the glass sleeve 20 placed about the resistor assembly prior to forming the glass-to-metal seal between the ends of the glass sleeve 20 and the end caps 16. The internal diameter of the glass sleeve 20 in the specific example is 0.087 inch plus or minus .004 inch. Consequently, the glass sleeve and the end caps 16 will have an average minimum spacing of about 0.001 inch and an average maximum spacing of about 0.005 inch. The space between the film 12 and sleeve 20 is filled with a reducing atmosphere.

Figure 3:
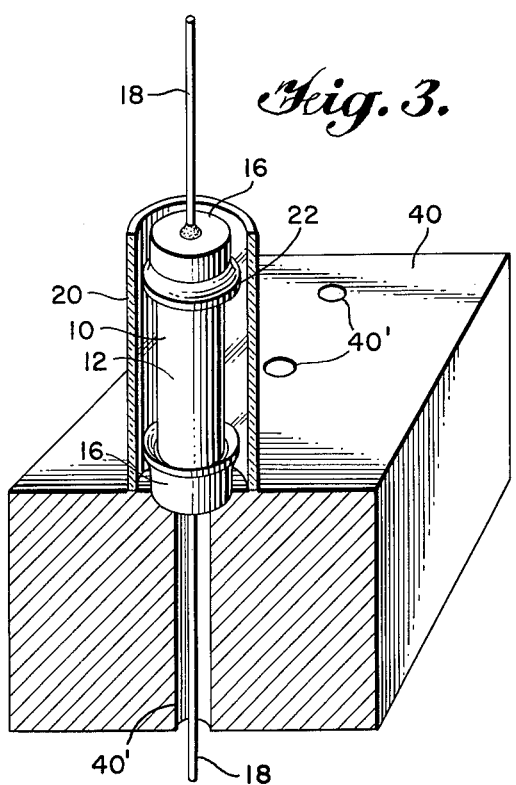
FIGURE 3 is a view in section showing the assembly mounted on a carbon block to be subjected to the heat treatment necessary to accomplish the glass-to-metal seal.
Figure 3:
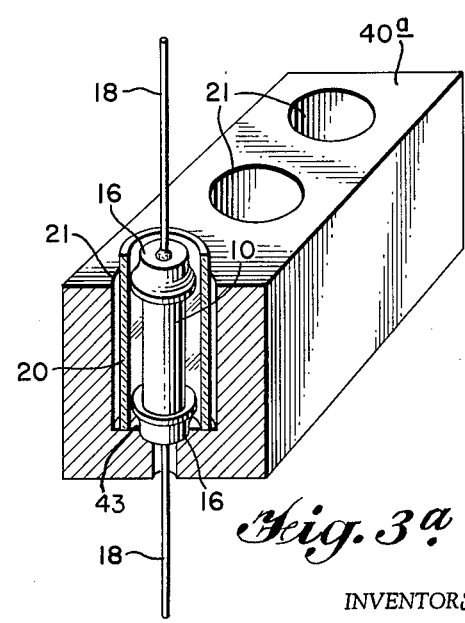

Referring now to FIGURES 3 and 4, the method for accomplishing the glass-to-metal seal will now be described in detail. As noted from FIGURE 3, the resistor assembly consisting of the ceramic core, carbon film, terminations and end caps is mounted on a carbon block 40 provided with a hole. The carbon block is approximately 0.4 inch in thickness, and the hole defined therethrough is of a diameter less than the diameter of an end cap. The glass sleeve to be sealed to the end caps is placed about the resistor assembly on the carbon block so that the two parts are arranged in a vertical or upstanding relationship. The carbon block 40 may be arranged with a plurality of other such assemblies on carrier 41. Block 40 is introduced into a furnace according to the scheme of FIGURE 4. The carbon block 40 is located on a chain conveyor 42 which passes over sprocket wheels 44 and 46, one of which is driven by a motor in such a manner that the carbon blocks 40 and carrier 41 pass through a furnace assembly. The entry to the furnace assembly is designated by the reference numeral 47, aand the first section 48 of the assembly comprises a series of locks 50 defined by swinging doors generally designated by the reference numeral 52. A manifold 54 into which is fed nitrogen gas is connected by means of short pipes 56 with each of the locks 50. The exit from the last lock 50 leads into a furnace chamber designated by the reference numeral 58. The furnace chamber is surrounded by a muffle type heating element 64 such as a ceramic block containing embedded resistance wire. A pipe 60 is connected to the furnace chamber for the purpose of introducing hydrogen gas into the main furnace chamber. Pipe 60 interconnects with a manifold 62 that extends the length of the furnace chamber 58. It will be noted at this point that the furnace chamber 58 is divided into two parts as shown in FIGURE 4. The heater 64 surrounding the left hand part of the furnace chamber 58 is the muffle type heater previously described. A cold water jacket 66 surrounds the right hand side of the furnace chamber 58 and is provided with a suitable inlet and outlet for cold water.

The manifold 62 extends the entire length of the furnace chamber 58 and is connected at its extreme right-hand end with a pipe 68 also for the purpose of admitting hydrogen to the manifold. The pipe 68 and pipe 60 join and are fed by two streams. A main supply 70 of purified hydrogen passes via pipe 72 through two flow meters 74 and 76. Approximately 10% of the flow in the pipe 72 passes through the meter 74, and the remaining 90% passes through the meter 76. The portion passing through the meter 74 is bubbled through a water bottle 78, thereby entraining a certain amount of water vapor. The water in the bottle 78 is maintained at ambient conditions. Thereafter, the two streams of hydrogen are recombined at the junction of pipes 60 and 68. Therefore, the hydrogen entering the manifold 62 at opposite ends is of the same consistency, containing a slight amount of water vapor. Exit pipes 80 and 82 are provided from the chamber 58 also at opposite ends. Also, exit pipes 84 are provided from the last two locks 50 and combined with the hydrogen exhaust in line 82 and sent to a burn-off designated by the reference numeral 86. The arrangement at the far end of the furnace is exactly the same in that four locks 90 are provided, each separated by means of swinging doors, and nitrogen is admitted via a manifold into the four locks. The exhaust from the two locks closest to the furnace chamber 58 are combined with the exhaust in pipe 80 and sent to a burn-off 92.

The profile of the temperature in the furnace is shown in FIGURE 5 with relation to both elapsed time and the movement of a carbon block 40 therethrough. The solid line in FIGURE 5 designates the gas temperature in the furnace 58, whereas the dotted line in FIGURE 5 represents the temperature of the resistor element in the furnace. It will be noted that the resistor element temperature lags behind the gas temperature during the movement of the resistor element through the furnace. This is an important consideration. The exact times and temperatures are listed in the following table and are the ones utilized in the drafting of the temperature profile shown in FIGURE 5.

*Temperature profile 14' furnace*

[Chain speed 3.43 in./min.; controller temperature 850° C.; $H_2$ 12.5 c.f.h. wet $H_2$ 2.5 c.f.h.; $N_2$ 40 c.f.h.]

| Travel Location Points | Time (Min.) | Temperature (Furnace atmosphere), ° C. |
|---|---|---|
| Block and Carrier entering first door | | 30 |
| | 1 | 30 |
| | 2 | 30 |
| | 3 | 30 |
| First door (on entrance side) close | | 30 |
| | 4 | 31 |
| | 5 | 31 |
| | 6 | 31 |
| | 7 | 34 |
| | 8 | 36 |
| | 9 | 39 |
| | 10 | 42 |
| Last door (on entrance side) close | | 56 |
| | 11 | 58 |
| | 12 | 67 |
| | 13 | 82 |
| | 14 | 105 |
| | 15 | 156 |
| | 16 | 252 |
| | 17 | 376 |
| | 18 | 506 |
| | 19 | 623 |
| | 20 | 712 |
| | 21 | 748 |
| Peak furnace temperature | | 803 |
| | 22 | 812 |
| | 23 | 812 |
| | 24 | 798 |
| | 25 | 767 |
| | 26 | 715 |
| | 27 | 640 |
| | 28 | 561 |
| | 29 | 481 |
| | 30 | 419 |
| | 31 | 305 |
| | 32 | 330 |
| | 33 | 292 |
| | 34 | 260 |
| | 35 | 232 |
| | 36 | 206 |
| | 37 | 183 |
| | 38 | 164 |
| | 39 | 147 |
| | 40 | 132 |
| | 41 | 118 |
| First door (on exit side) open | | 107 |
| | 42 | 100 |
| | 43 | 92 |
| | 44 | 83 |
| First door (on exit side) close | | 74 |
| | 45 | 67 |
| | 46 | 63 |
| | 47 | 59 |
| | 48 | 56 |
| | 49 | |

The purpose of the water vapor entrained in the hydrogen gas is to take care of carbon produced by thermal-decomposition of any organics that may be present in the resistor package. The obvious source of organics is the binder employed in the electrical termination, and the water vapor serves to oxidize the amorphous carbon formed. The hydrogen atmosphere is necessary to prevent degradation of the carbon film during the encapsulation in the glass sleeve.

During the pass through the furnace, the resistor assembly will be heated. The end caps, being metal, will heat more quickly than the remaining parts. Because the lips of the end caps are flared, they will be closer to the glass sleeve than any other part of the assembly. Consequently the annular portions of the glass sleeve radially aligned with the flared lips of the end caps will become softened first and drawn onto the flared lips of the end caps. The glass will wet the metal caps, and gradually the end portions of the glass sleeve will go from the condition shown in FIGURE 1 to that shown in FIGURE 2. The end caps cannot be oxidized to form a good metal-to-glass seal as the art suggests, because the sealing is carried out in a reducing atmosphere. Therefore, the end caps are roughened by sand blasting prior to assembly.

The glass-to-metal seals occur before the center section of the glass sleeve softens and falls against the carbon film. Since the heating takes place with the parts arranged vertically, the sleeve may sag and bow in slightly, but it does not touch the carbon film. As is readily noted, a reducing atmosphere is sealed within the sleeve.

From the temperature profile of FIGURE 5 it can be seen that the gas temperature (solid line) in the furnace leads the temperature of the assembly (broken line). The glass temperature, never quite reaches the peak furnace temperature as the gas temperature falls off rapidly. The assembly temperature follows a more gradual slope. This is significant as the annealing temperature range for the glass sleeve is from about 450° C. to about 650° C. As can be determined from FIGURE 5, it takes about six minutes to drop the temperature of the glass sleeve through this range. Therefore, the glass cools at a relatively slow rate, about 33° C. per minute, and subsequent tests show the glass stress to be about 150 lbs./square inch average.

The carbon block or boat 40a shown as in FIGURE 3a is a modified boat which is used in a similar manner to block or boat 40 for larger size resistor elements. In this boat (40a) the glass sleeve 20 is inserted in a circular recess 21 in such a manner that both ends of the sleeve are exposed to the furnace atmosphere, but the central portion of the sleeve is shielded by the main body of the block 40a. A ledge 43 supports both the sleeve and resistor element during their movement through the furnace. Both carbon blocks 40 and 40a are supported on a metal frame carrier 41, which in turn is supported on the travelling chain conveyor 42, so that the conveyor, carriers and blocks all move simultaneously thorugh the furnace. While the furnace heater 64 is set to provide a maximum furnace atmosphere temperature of 812° C. inside the furnace, this temperature will not be uniform throughout the length of the furnace (as shown in the temperature profile curves of FIGURE 5) due to the fact that the doors at each end of the furnace admit cooler atmosphere when the individual resistor elements are entering and leaving the furnace. The temperature of the furnace atmosphere was measured by a thermocouple which was substituted for one of the resistor elements and travelled through the furnace on one of the carbon blocks or boats 40 (or 40a). The temperature of the resistor elements was measured by a thermocouple located adjacent the carbon film 12 and inside the glass sleeve 20.

Although the present invention has been shown and described with respect to preferred embodiments, various changes and modifications will occur to those skilled in the art which do not depart from the spirit, scope and contemplation of this invention. Accordingly, said changes and modifications are deemed to come within the purview of the teachings and concepts of this invention, as defined by appended claims.

What is claimed is:

1. A method of encapsulating a resistor element comprising the steps of: assembling a resistor element having flared metal cap members attached to each end thereof within and co-axial to a glass member, said glass member extending the length of said resistor element and being in close proximity to said flared portion of said end metal cap members, heating said resistor element and glass member assembly by passing it through a heated reducing atmosphere at a temperature sufficient to soften the glass and cause the glass adjacent said metal cap members to collapse due to the higher glass temperature in the proximity of the metal cap members, thereby causing said melted portions of said glass member to collapse, contact the metal cap members and form a glass-to-metal seal therewith, and cooling said assembly to prevent the collapse of the remaining portion of said glass member.

2. A method as in claim 1 wherein the reducing atmosphere contains a small amount of water vapor.

3. A method as in claim 1 wherein the glass member is annealed during cooling.

4. A method as in claim 3 wherein the annealing is conducted by cooling the glass member about 40° C. per minute.

5. A method as in claim 1 including the prior step of sand blasting the metal members to roughen their surfaces.

References Cited by the Examiner

UNITED STATES PATENTS

| | | | |
|---|---|---|---|
| 2,085,587 | 6/37 | Hotchkiss | 29—494 |
| 2,192,255 | 3/40 | Bickley | 338—237 |
| 2,315,294 | 3/43 | Stewart et al. | 29—494 |
| 2,385,385 | 9/45 | Stoffel | 29—155.71 |
| 2,697,805 | 12/54 | Collins | 65—59 |
| 2,893,182 | 7/59 | Pies | 29—155.63 |
| 2,897,583 | 8/59 | Patrichi | 29—155.5 |
| 2,960,757 | 11/60 | Epstein | 29—155.71 |
| 2,977,561 | 3/61 | Pugh et al. | 338—237 |

WHITMORE A. WILTZ, *Primary Examiner.*

MARCUS U. LYONS, *Examiner.*